US008606052B2

(12) United States Patent
Mercur'ev

(10) Patent No.: US 8,606,052 B2
(45) Date of Patent: Dec. 10, 2013

(54) METHOD OF STITCHING AND LINEARIZATION OF MULTISENSOR DETECTORS GAIN CHARACTERISTICS

(75) Inventor: Sergey V. Mercur'ev, Sankt-Petersburg (RU)

(73) Assignee: Zakrytoe akcionernoe obshchestvo "Impul's", Sankt-Petersburg (RU)

( * ) Notice: Subject to any disclaimer, the term of this patent is extended or adjusted under 35 U.S.C. 154(b) by 0 days.

(21) Appl. No.: 13/550,451

(22) Filed: Jul. 16, 2012

(65) Prior Publication Data

US 2013/0020476 A1      Jan. 24, 2013

(30) Foreign Application Priority Data

Jul. 18, 2011   (EP) .................................. 201100963

(51) Int. Cl.
*G06K 9/20*           (2006.01)
(52) U.S. Cl.
USPC ............ 382/312; 382/128; 382/132; 382/274
(58) Field of Classification Search
USPC ................. 382/294, 304, 128, 132, 274, 312; 345/603; 348/441; 250/208.1, 252.1; 257/226, 440, 445, 463
See application file for complete search history.

(56) References Cited

U.S. PATENT DOCUMENTS

| | | | | |
|---|---|---|---|---|
| 7,433,507 | B2 * | 10/2008 | Jabri et al. ..................... | 382/132 |
| 7,923,801 | B2 * | 4/2011 | Tian et al. ...................... | 257/440 |
| 8,116,595 | B2 * | 2/2012 | Hopkins et al. ................ | 382/304 |
| 8,482,093 | B2 * | 7/2013 | Tian et al. ...................... | 257/444 |

OTHER PUBLICATIONS

Howell, "Handbook of CCD Astronomy", Cambridge University Press, 2000.
Kodak, "Multiple Output Sensors Seams Correction", Application Note, 2009, (www.kodak.com/global/plugins/acrobat/en/business/ISS/supportdocs/MultipleOutputSensorsSeamsCorrection.pdf).
Rad-Icon Imaging Corp, AN08: "Polynomial Gain Correction for RadEye Sensors", (www.rad-icon.com/pdf/Radicon_AN08.pdf).
Liji et al., "A Practical Non-linear Gain Correction Method for High-resolution CMOS Imaging Detectors", 2008, (https://www.hoertech.hausdeshoerens-oldenburg.de/dgmp2008/abstract/Cao.pdf&rct=j&q=Liji Practical Non-linear Gain Correction Method for High-resolution pdf).
Gino, "Noise, Noise, Noise", (http://www.astrophys-assist.com/educate/noise/noise.htm).
Miroshnichenko et al.,"Theory and Technique of Multisensory Digital X-ray Detectors." Biotechnosphera, No. Apr. 10, 2010.
Jaehne, "Digital Processing of Images", M., Technosphera, 2007, p. 583.

\* cited by examiner

*Primary Examiner* — Anh Do
(74) *Attorney, Agent, or Firm* — Patentbar International, P.C.

(57) ABSTRACT

Digital detectors of X-ray image intended for stitching and linearization of gain characteristics of independent sensors of multisensor detectors are disclosed. The technical result is the development of methodology of stitching and linearization of multisensor detectors gain characteristics under the conditions of non equal irradiance (the use of radiation source with flat X-ray (light) field is not required). The method is based on calculation of LUT functions for conversion of output signals intensity of detector sensors. As a result of application of the stated conversion LUT functions the sensors gain characteristics are received which are the same and linear within the precision of measurements. Calculation of stitching LUT functions employs the availability of non-equal X-ray (light) field slowly changing along the area of detector. The responses of any two adjacent sensors with the same gain characteristics shall have similar values near the joint of these sensors.

6 Claims, 6 Drawing Sheets

METHOD OF STITCHING AND LINEARIZATION OF MULTISENSOR DETECTORS GAIN CHARACTERISTICS

RELATED APPLICATIONS

This application claims priority to Eurasian Patent Application No. 201100963, filed Jul. 18, 2011, which is incorporated herein by reference in its entirety.

FIELD OF THE INVENTION

The invention relates to the area of X-ray technology, namely to the digital detectors of X-ray image and is intended for X-ray image enhancement. More specifically the present invention is designed for stitching and linearization of gain characteristics of independent sensors of multisensor detectors.

BACKGROUND OF THE INVENTION

At present the application of digital multisensor detectors in medicine, astronomy and the other areas is continuously extended [Howell S. B. *Handbook of CCD Astronomy*. Cambridge University Press, 2000; Gino M. Noise, *Noise, Noise*; S. I. Miroshnichenko, A. A. Nevgasimyj *Theory and technique of multisensor digital X-ray receivers. Biotechnosphere*, No. Apr. 10, 2010; B. Yane *Digital processing of images*, M., Technosphera, 2007].

The image in multisensor detectors can be formed by several CCD or CMOS sensors. Each sensor of multisensor detector, in its turn, can consist of smaller sensors with their own signal conversion path. Gain characteristics of each sensor of such detector, that determine output values of signal intensity of the formed image will differ due to technologic and other reasons. The discrepancy of gain characteristics result in common inhomogeneity of response (inhomogeneity of output image) of detector, in occurrence of discontinuous changes (so called stitches) at the joints of sensors in the resulting digital image. Therefore, in actual practice, when using multisensory detectors, the task arises to stitch the gain characteristics of sensors, constituting the same detector. For the purpose of image acquisition, homogeneous in response and without any stitches at the sensor joints, the procedure of calibration shall be applied which could stitch all the characteristics to the set one. In addition to combining, in order to perform calibration of the flat field, the task of gain characteristics linearization shall be settled.

There are several approaches to settle the task of stitching characteristics. In case of sensors linear responses the standard approach is so called two-point calibration. The methods of stitching and linearization of their characteristics at highly nonlinear characteristics of CMOS-sensors are known. For example, the method of stitching and linearization pixel by pixel of CMOS sensors characteristics is described in the source [*Rad-icon Imaging Corp. AN08: Polynomial Gain Correction for RadEye Sensors*, www.rad-icon.com/pdf/Radicon AN08.pdf)], wherein:

Using the source of light field with equal distribution of intensity along the detector field-of-view (FOV), two calibration images are received at two levels of input signal, the first level of input signal being selected twice as little as the next one;

Parameters of quadratic dependence simulating the sensor response are determined and using the calibration images received the correction function is set up which linearizes and stitches pixel characteristics of CMOS-sensor.

The other method of stitching and linearization of CMOS-sensors pixels is described in the source [Liji C., Jorg P. *A Practical Non-linear Gain Correction Method for High-resolution CMOS Imaging Detectors*], wherein:

Three calibration images at three various levels of output signal are received using light field with equal distribution of intensity along the detector field-of-view;

The responses of sensor pixels are simulated by piecewise quadratic plain dependence of three segments;

Parameters of model dependence are determined and using the calibration images received the correction function is set up which linearizes and stitches pixel characteristics of CMOS-sensor.

The nearest to the inventive engineering solution is the method described in the source [*Kodak. Multiple Output Sensors Seams Correction. Application Note*, 2009], wherein the sensor-by-sensor linearization and stitching of the detector characteristics is performed.

Within this method:

The series of N calibration images is received at increasing values of radiation intensity using the light field source with equal distribution of intensity along the detector field-of-view;

The sensor responses are measured by way of LUT functions describing dependence of output signal on the values of the input signal, The measured sensor responses are linearized and stitched to the one response arbitrarily selected among these linearized responses.

In all the methods of linearization and stitching of gain characteristics listed above, including the method [*Kodak. Multiple Output Sensors Seams Correction. Application Note*, 2009], the light field source is used with equal distribution of intensity along the detector filed-of-view. However, in some cases it is inconvenient or essentially impossible to use such source. The inconvenience is connected with difficulty of its generation. The impossibility to use light field source with equal distribution of intensity along the detector filed-of-view can be caused, for example, by designer's availability of detector with already integrated scintillation screen converting X-ray radiation to light. In the latter instance, only non-planar X-ray field turns out to be available to stitch and linearize gain characteristics of sensors of multisensory detector causing non-equal distribution of intensity along the detector filed-of-view (non-equal irradiance (light) illumination).

The present invention object is the development of method of stitching and linearization of detector gain characteristics under the conditions of non-equal irradiance.

SUMMARY OF THE INVENTION

The technical result of the alleged invention is to present method of stitching and linearization of multisensory detectors gain characteristics under the conditions of non-equal irradiance (the use of radiation source with equal distribution of intensity along the detector field-of-view is not required).

The technical result in the method of stitching and linearization of multisensory detectors gain characteristics consisting in obtaining series of N calibration images with equal distribution of intensity along the detector filed-of-view at increasing values of radiation intensity, measuring sensor responses by way of Look-Up Tables (LUTs) functions describing dependence of output signal on the values of the input signal, linearization and stitching of measured sensor responses to the one response arbitrarily selected among these linearized responses, IS ACHIEVED BY accumulation along joints of adjacent sensors of M values of their responses at the received detector calibration images by way of moving average calculation, obtaining for each pair of adjacent sensors the assembly of M×N LUT transformation functions which perform direct conversion of boundary values of adjacent sensors signal; the obtained LUT conversion functions interpolate for the whole dynamic range of detector output signal intensity, obtaining assembly of M stitching LUT functions of the adjacent sensors; it is further averaged obtaining for each sensor the LUT function of stitching its response to the response of the adjacent sensor; the response of any sensor is selected as the reference one and the LUT functions of stitching of sensors responses to the reference sensor response are modified successively, obtaining LUT functions of stitching of sensors responses to the reference sensor response, at that each stitching LUT function for the current sensor is set up taking into account the LUT function of stitching of the previous sensor; the linearization LUT function is calculated which performs linearization of reference sensor response and the stitching LUT functions are modified successively using the determined linearization function obtaining resulting LUT functions of stitching of detector sensors responses to the linearized response of the selected reference sensor.

It is possible to perform the invention in such a way that instead of accumulation of M values of sensors responses using method of calculation of moving average along the sensors joints, the moving localized linear approximation of signal by plane with extrapolation of its M values outside the sensor is used allowing to decrease the influence of gradient of input X-ray (light) field at the joints of replaceable sensors. The other possible variant is to perform stitching and linearization of gain characteristics of sensors of detector being irradiated by the input light field with non-equal intensity.

At least one sensor can be divided into parts and the intra-sensor stitching can be performed first followed by inter-sensor stitching of characteristics.

The main distinctive aspect of the present invention lies in the fact that the stitching and the linearization of multisensory detectors characteristics does not require to use the radiation source with equal distribution of intensity along the detector filed-of-view.

BRIEF DESCRIPTION OF THE DRAWINGS

The inventive engineering solution, the possibility of its technical realization and the achievement of the technical result is illustrated by FIGS. 1-6.

DETAILED DESCRIPTION OF THE PREFERRED EMBODIMENTS

Figure 1:
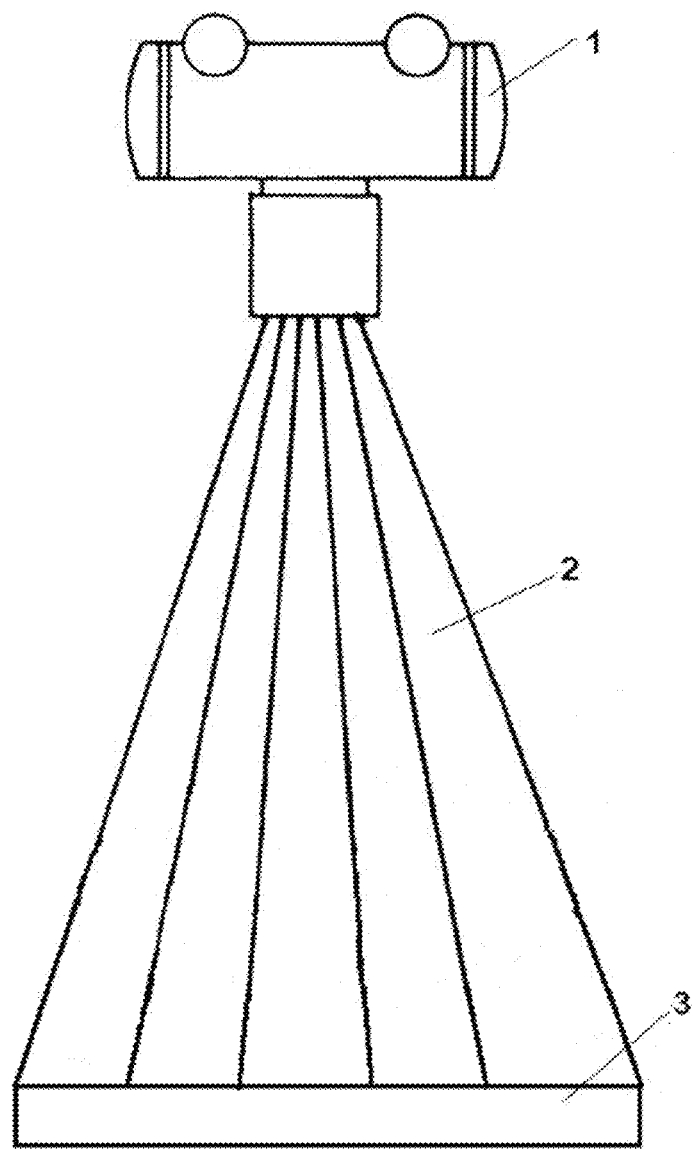
FIG. 1 shows a device for X-ray imaging.

The acquisition of X-ray images is performed, for example, using the device shown in FIG. 1. It consists of X-ray tube 1 which emits X-ray beam 2. The X-ray beam 2 is received by detector 3. The detector 3 includes scintillation screen (not drawn) and the matrix array camera (not drawn). The scintillation screen is optically connected with the surface of the active matrix array camera. The matrix array camera (not drawn) consists of at least one sensor. It can consist of any finite number of sensors, for instance, of two.

Figure 2:
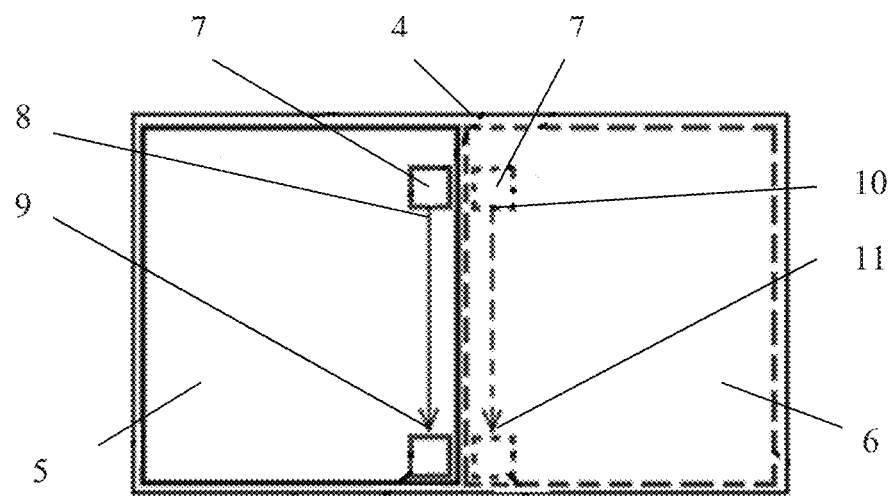
FIG. 2 shows general scheme of sensor responses evaluation used in the present invention to stitch them.

The X-ray beam 2 falls on detector 3, the scintillation screen converts it into visible light which is in its turn converted into digital form by the detector sensors. The stated form represents digital image consisting of several parts which number corresponds to the number of sensors in detector. FIG. 2 shows schematically the digital image 4 formed by detector 3, consisting of two adjacent sensors 5 and 6.

In accordance with the inventive method the series of N calibration images is made first. The calibration images are performed with equal distribution of intensity along the detector filed-of-view without absorbing objects. The images are generated at increasing values of radiation intensity with random step by intensity from zero exposure (the read-out image) up to occurrence of saturation signal from detector sensors. Since the radiation field is in general non-planar, the sensors of detector 3 achieve saturation unequally. To decrease noise influence at the following stage of sensors response evaluation several images are obtained for each value of intensity being averaged afterwards. Simultaneously with obtaining series of images the values of radiation intensity are measured by dosimeter (not drawn) at the arbitrarily chosen place of detector 3, disposing it, for example, above the detector 3 or alongside of it.

Figure 3:
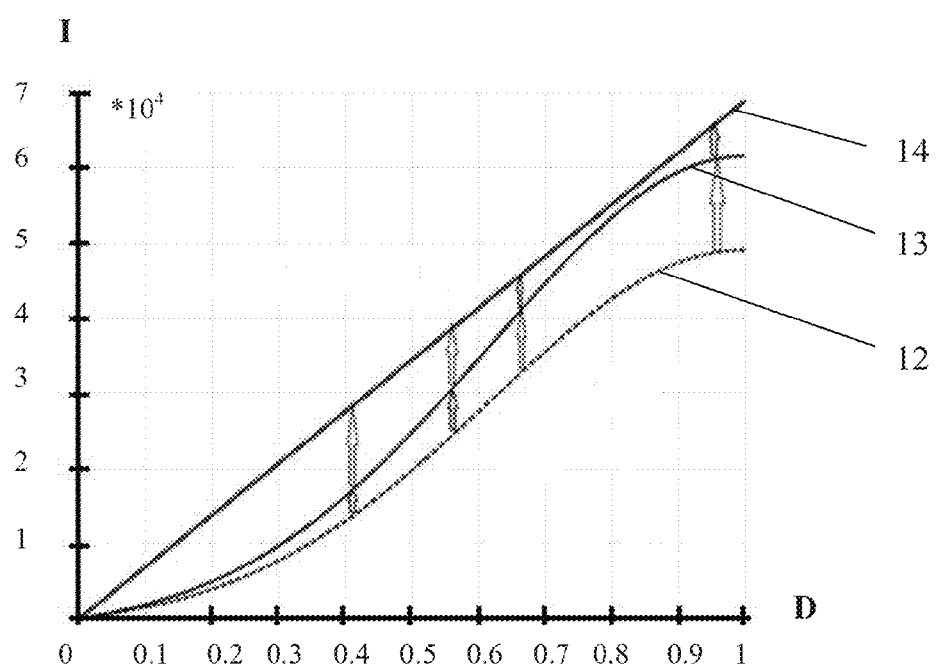
FIG. 3 shows the schematic diagram of stitching and linearization of sensor characteristics of detector consisting of two adjacent sensors only.

Then the M values of sensor responses are accumulated using method of calculation of moving average by means of small-size evaluation unit of signal 7, for instance, 30××30 pixels, along joints of adjacent sensors. The evaluation unit of signal 7 in position 8 corresponds to sensor response 5 under number 1, position 9 (FIG. 2) of evaluation unit of signal 7 corresponds to the sensor response 5 under number M. Likewise for sensor 6 the position 10 of evaluation unit of signal 7 corresponds to the first response of sensor 6, and the position 11 of evaluation unit of signal 7 corresponds to the response of sensor 6 under number M. For signal evaluation the sample average is used or, in order to increase noise tolerance,—the median. FIG. 3 shows graphs of functions where 12—response of sensor 5 in one of the M positions of evaluation unit of signal 7 at joint of adjacent sensors 5 and 6, 13—responses of sensor 6 in one of the M positions of evaluation unit of signal 7, 14—the desirable common linear response of the neighboring sensors 5 and 6. At the horizontal axis of graph (FIG. 3) the measured values of intensity are shown (in relative units, for instance, in doses (D), standardized to the maximum intensity value), at the vertical axis—the calculated value of signal intensity (I) at the selected signal evaluation area.

The main idea of accumulation of sensor responses value along their boundaries consists in the use of the fact that near the sensors joints, the radiation intensity is virtually the same with the input X-ray (light) field smoothly changing along the area of detector 3, that is why the values of responses of corrected sensors 5 and 6 have similar values at the joints. To realize the idea on the basis of received M values of signal responses of sensors for N calibration images, the assembly of M×N LUT conversion functions is received, which perform direct conversion of boundary values of one of adjacent sensors signal into the boundary values of signal the other sensor. For example, each output signal intensity of sensor 6, calculated at its boundary in the calibration image is associated with the value of boundary intensity of sensor 5.

These LUT conversion functions interpolate for the whole dynamic range of detector output signal intensity, obtaining assembly of M LUT functions of stitching.

The assembly of M LUT of stitching is averaged for the purpose of the following decrease of error in signal evaluation caused by noise presence at the calibration images.

In such a manner for each sensor the LUT of stitching its response to the response of the adjacent sensor is received. For this purpose the response of any of the detector sensors (for example, the response of sensor 5 in FIG. 2) is selected hereinafter referred to as the reference, and the stitching LUTs are modified successively, from the reference one to the other sensors to the effect that the stitching of gain characteristics of sensors to the gain characteristic of the reference sensor 5 to be performed.

As a result, such stitching LUTs are received by calibration images, which provide stitching of gain characteristics of sensors of multisensory detector.

In addition to the stitching of gain characteristics of sensors 5 and 6, the calibration of flat field is performed, the gain characteristic of reference sensor 5 is linearized and is converted into gain characteristic of sensor 6 to the linearized gain characteristic of the reference sensor 5. That is, the LUT of linearization is calculated which performs linearization of reference sensor response. Then, the LUTs of stitching are successively modified by means of determined linearization function receiving the resulting LUTs of stitching of responses of sensor 6 of the detector to the linearized response of the selected reference sensor 5.

Figure 4:
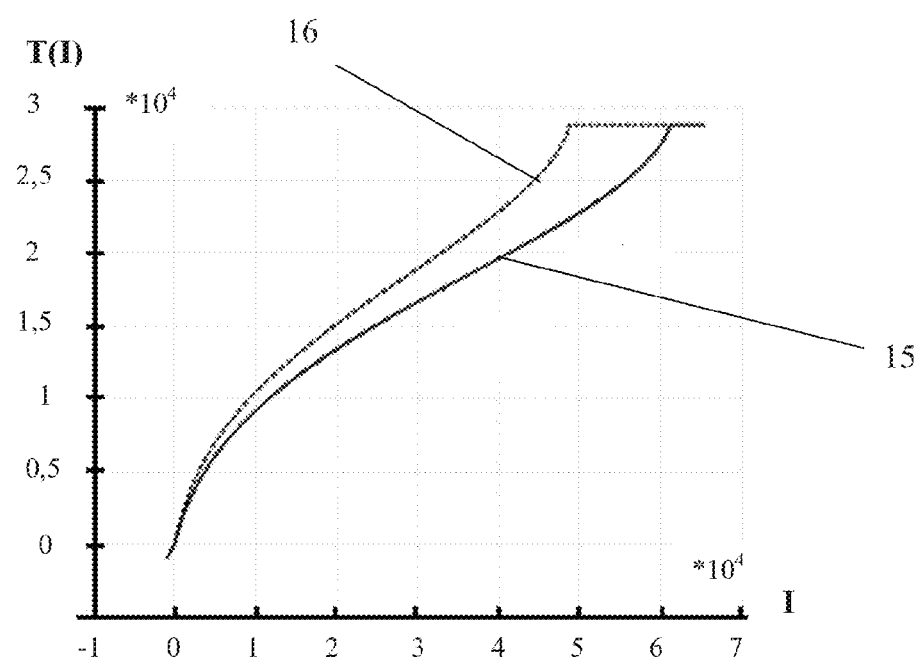
FIG. 4 shows LUT functions graphs of conversion of gain characteristics stitching and linearization.

FIG. 4 shows the graph of stitching LUTs 15 of sensor 5 response to the linear response 14 FIG. 3, 16—graph of stitching LUT of the response of sensor 6 to the linear response 14 FIG. 3, at the horizontal axis (FIG. 4) the input intensity signal (I) is set, at the vertical axis the output intensity T(I) is depicted.

The described scheme of stitching and linearization of gain characteristics proposes that the response of each separate sensor is determined, first of all, by one characteristic. Various combinations of stitching and linearization of multisensory detectors gain characteristics are possible. If the sensor characteristic has various nonlinearity within separate sensor, the scheme of stitching and linearization described here allows for a possibility to divide sensor into parts and to perform first intra-sensor stitching followed by inter-sensor stitching of characteristics. In order to decrease the gradient influence at the sensors joints, especially when using input field with the big gradient, the method of moving localized linear approximation of signal by plane with extrapolation of its M values outside the sensor is used, instead of accumulation of M values of sensor responses by method of calculation of moving average along the sensors joints at the received calibration images.

Figure 5:
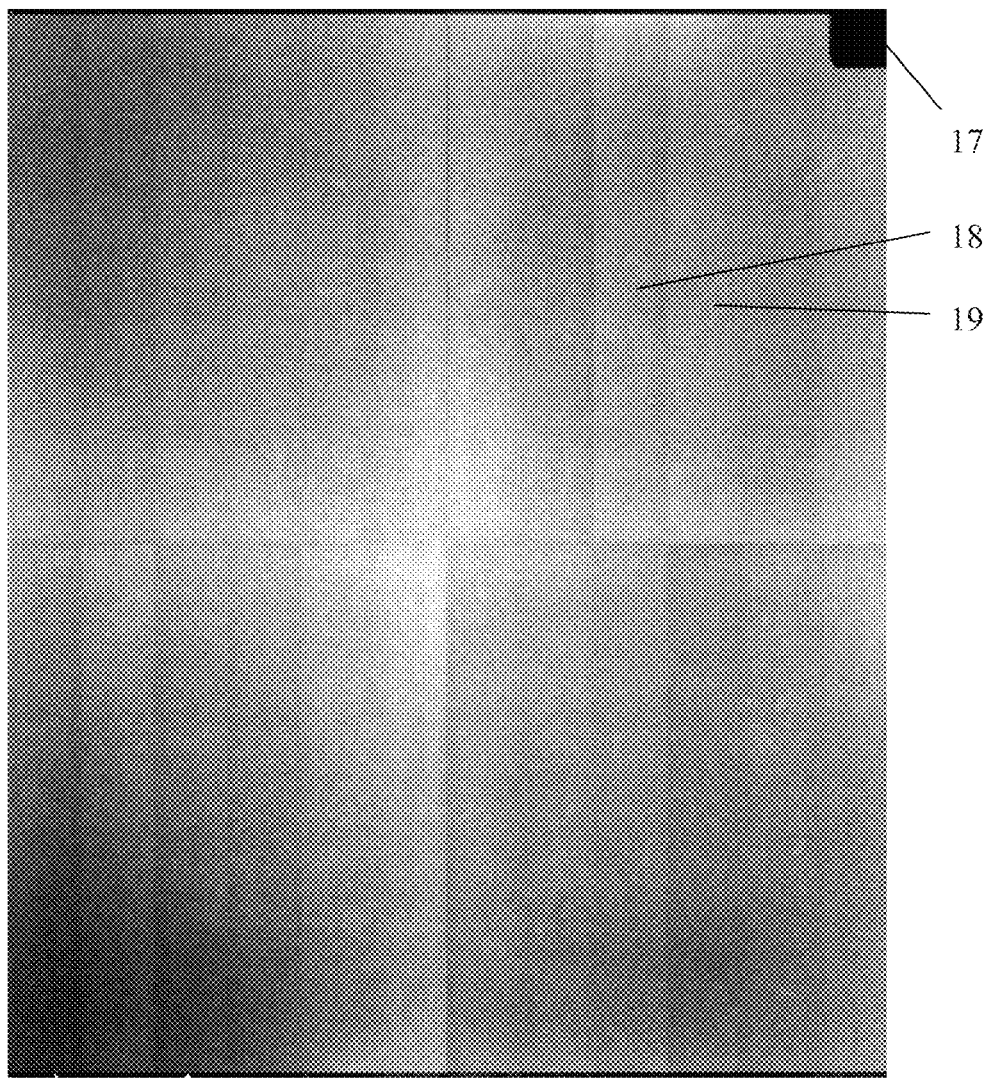
FIG. 5 shows initial X-ray image 5000×4000 pixels in size obtained using detector consisting of 24 sensors.
Figure 6:
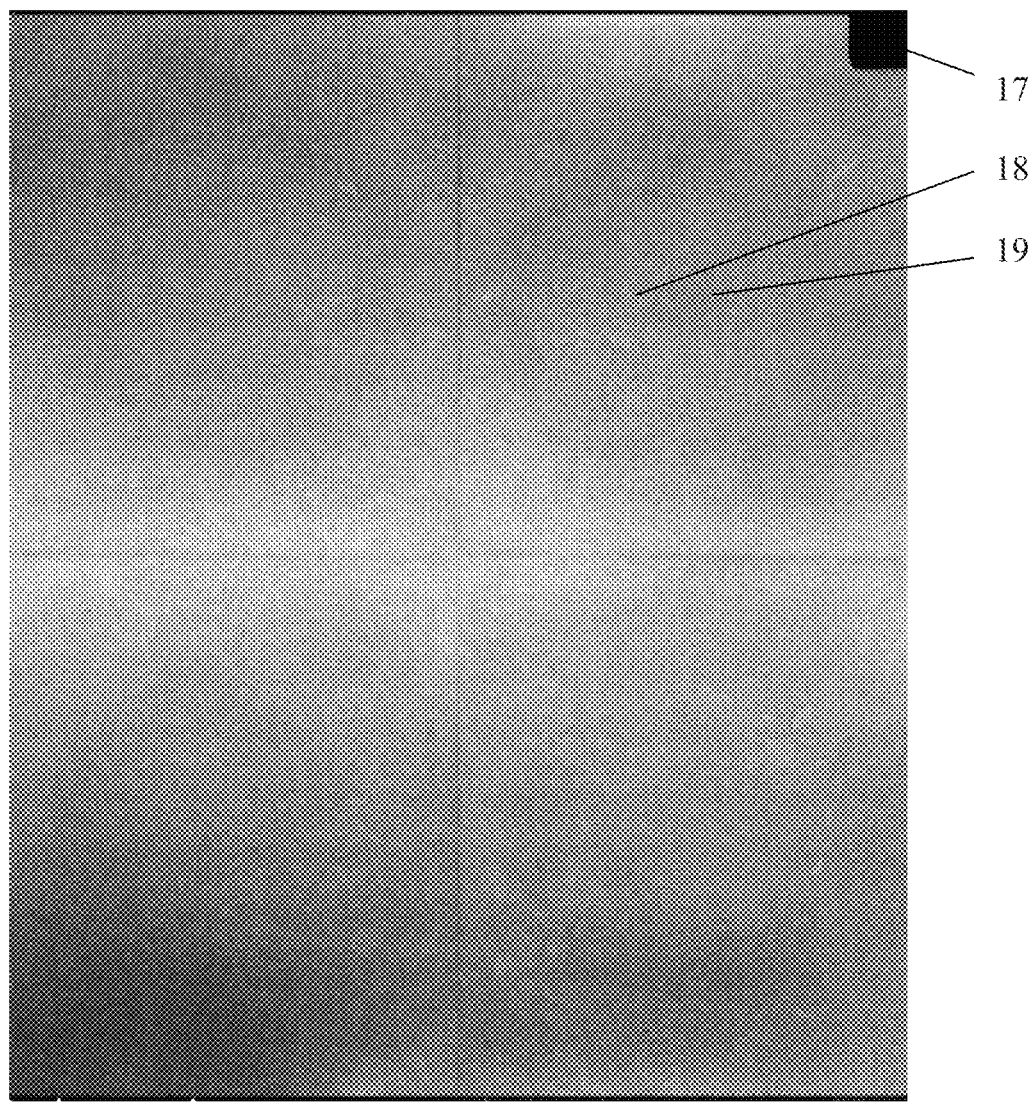
FIG. 6 illustrates effectiveness of the technique of stitching and linearization of gain characteristics for detector consisting of 24 sensors proposed in the present invention.

The result of application of inventive method is shown in FIG. 5-6. FIG. 5 depicts the shot with size 5000×4000 pixels, consisting of 24 sensors, where 17—image of dosimeter, 18 and 19—images received from the two neighboring sensors of detector 3. FIG. 5 illustrates differences in response of sensors, consisting, in particular, in the availability of joints between the images 18 and 19 received from the adjacent sensors. FIG. 6 shows the example of application of the method of stitching and linearization of sensors gain characteristics stated in this invention: the responses of sensors became the same and linear, the boundaries between the sensors are imperceptible.

BEST MODE OF PRACTICING THE INVENTION

The following embodiment of the inventive method is possible. First the series of N calibration images with equal distribution of intensity along the detector filed-of-view (FIG. 2) is received. The images are generated at increasing values of radiation intensity $D_j$, $j=\overline{1,N}$ with random step by intensity from zero exposure (the read out image) up to saturation of signal from detector sensors. The radiation intensity is measured by dosimeter located at the random place at the detector surface. To decrease the noise influence, several images are received and averaged for each intensity value.

Then using evaluation unit of signal 7, M values of adjacent sensors responses are accumulated along the joints of the adjacent sensors at the obtained calibration images of detector by method of calculation of moving average. For the sake of simplicity the situation will be considered when the detector consists of two sensors only (FIG. 2). The signal evaluation in this case shall be performed by the following formulas:

$$R_{i,j}^1 = \text{median}(S_1(x \pm \Delta, y \pm \Delta)), R_{i,j}^2 = \text{median}(S_2(x \pm \Delta, y \pm \Delta)),$$

where $R_{i,j}^1$—the evaluation array of signal of the first sensor $S_1$, $R_{i,j}^2$—the evaluation array of signal of the second array $S_2$, $\Delta$—radius of evaluation unit of signal, $i=\overline{1,M}$—number of signal evaluations at the joint of sensors, $j=\overline{1,N}$—overall number of calibration images, (x, y)—center coordinates of evaluation unit of signal. When using the smooth X-ray field, the radiation intensity near the joint is virtually the same, therefore using the sensors with the same gain characteristics the following approximate equation shall be performed $$R_{i,j}^1 \approx R_{i,j}^2. \tag{1}$$

The arrangement of LUT conversion is performed in the proposed invention based on the use of approximate equation (1).

To that effect:

1. The assembly of M×N LUT conversion functions of the following view $T_i = (R_{i,j}^2, R_{i,j}^1)$, $i=\overline{1,M}$ is received for the adjacent sensors pair.

2. The LUT conversion $T_i$ are interpolated within the whole dynamic range I (for instance, $I=[0,2^{16}-1]$) of detector, the stitching LUT functions of sensors $\tilde{T}_i = \text{interpolate}(T_i) = \tilde{T}_i(k)$, $k \in I$ are received.

3. The LUT stitching are averaged, i.e. one LUT function of stitching T of response of sensor 6 to sensor 5 is received $$T(k) = \underset{i=\overline{1,M}}{\text{average}}(\tilde{T}_i), k \in I. \tag{2}$$

When averaging by formula (2) the averaging by assembly of functions is used set at the same value grid of the dependent argument (input brightness $k \in I$). This T stitching LUT function represents the desirable LUT which stitches distinguishing gain characteristics of sensors 5 and 6 to one (to the characteristic of the reference sensor 5) (FIG. 2).

Afterwards to perform linearization procedure of the sensors gain characteristics the response of any sensor is selected, for example, let us assume that it is the response $R_{M,j}^2$ of sensor 6, and the determined LUT conversion function is applied to it $$\tilde{R}_{M,j}^2 = T(R_{M,j}^2).$$

1. Considering response $\tilde{R}_{M,j}^2(D_j)$ as a function of the measured radiation intensity $D_j$, $j=\overline{1,N}$ (of dose), the decline parameter a of the desirable linear characteristic of detector sensors is found by the following formula [*Kodak. Multiple Output Sensors Seams Correction. Application Note*, 2009]:

$$\sum_{j=1}^{N}\left(1-\frac{aD_j}{\tilde{R}_{M,j}^2}\right) \to \min_{a}.$$

2. The LUT function for linearization is set up, linearizing sensor 6 with its interpolation for the whole dynamic range of detector $$T_{lin}=(\tilde{R}_{M,j}^2, aD_j),$$

$$\tilde{T}_{lin}=\text{interpolate}(T_{lin})=\tilde{T}_{lin}(k), k \in I$$

3. The resulting stitching LUT of sensors 5 and 6 responses are found therefore by the formulas $$T(k)_1=\tilde{T}_{lin}(k), T_2(k)=\tilde{T}_{lin}(T(k)), k \in I \text{ (sensor 5 was not changed)}.$$

The scheme of successive stitching and linearization of sensors gain characteristics outlined herein can be easily extended to the case of more than two sensors in detector.

REFERENCES

1. Howell S. B. *Handbook of CCD Astronomy*. Cambridge University Press, 2000.
2. Kodak. Multiple Output Sensors Seams Correction. Application Note, 2009. (www.kodak.com/global/plugins/acrobat/en/business/ISS/supportdocs/MultipleOutputSensorsSeamsCorrection.pdf).
3. Rad-icon Imaging Corp. AN08: Polynomial Gain Correction for RadEye Sensors (www.rad-icon.com/pdf/RadiconAN08.pdf).
4. Liji C., Jorg P. A Practical Non-linear Gain Correction Method for High-resolution CMOS Imaging Detectors. (https://www.hoertech.hausdeshoerensoldenburg.de/dgmp2008/abstract/Cao.pdf&rct=j&q=Liji Practical Non-linear Gain Correction Method for High-resolution pdf).
5. Gino M. Noise, Noise, Noise. (http://www.astrophys-assist.com/educate/noise/noise.htm)
6. S. I. Miroshnichenko, A. A. Nevgasimyj Theory and technique of multisensory digital X-ray receivers. Biotechnosphera, No. Apr. 10, 2010.
7. B. Jähne Digital Image Processing, M., Technosphera, 2007, p 583.

What is claimed is:

1. A method of stitching of multisensory detectors gain characteristics, the method comprising:
    obtaining series of N calibration images with equal distribution of radiation intensity along a detector filed-of-view at increasing values of radiation intensity;
    measuring sensor responses by way of LUTs describing dependence of output signal on the values of an input signal;
    linearizing and stitching of the measured sensor responses to one response arbitrarily selected among these linearized responses;
    accumulating M values of sensors' responses along joints of adjacent sensors at the received detector calibration images by way of moving average calculation, obtaining for each pair of the adjacent sensors an assembly of M×N LUT transformation functions performing direct conversion of boundary values of signals of the adjacent sensors;
    interpolating the LUT transformation functions for the whole dynamic range of detector output signal intensities to obtain assembly of M LUT functions of stitching of the adjacent sensors;
    further averaging the dynamic range to obtain for each sensor the LUT function of stitching its response together to the response of the adjacent sensor;
    selecting the response of any sensor as a reference sensor response and modifying successively the LUT functions of stitching of the sensors responses to the reference sensor response to obtain LUT functions of stitching of sensors responses to the reference sensor response, wherein each LUT function of stitching for the current sensor is set up to take into account the stitching LUT function of the previous sensor;
    calculating the LUT function for linearization to performs linearization of the reference sensor response and successively modifying the LUT functions of stitching using the determined linearization function to obtain resulting stitching LUT functions of the detector sensors responses to the linearized response of the selected reference sensor.

2. The method as claimed in claim 1, wherein after receiving the series of calibration images the M values of the signal is evaluated by moving localized linear approximation of the signal by a plane with extrapolation of its M values outside the sensor.

3. The method as claimed in claim 1, further comprising stitching and linearizing of amplitude characteristics of the sensors of the detector light-exposed by the input light field with non-equal intensity.

4. The method as claimed in any of claim 1, wherein at least one of the sensors is divided into portions and the intra-sensor stitching of its characteristics is performed followed by inter-sensor stitching of the characteristics.

5. The method as claimed in any of claim 2, wherein at least one of the sensors is divided into portions and the intra-sensor stitching of its characteristics is performed followed by inter-sensor stitching of the characteristics.

6. The method as claimed in any of claim 3, wherein at least one of the sensors is divided into portions and the intra-sensor stitching of its characteristics is performed followed by inter-sensor stitching of the characteristics.

\* \* \* \* \*